(12) United States Patent
Sugimoto et al.

(10) Patent No.: US 10,434,939 B2
(45) Date of Patent: Oct. 8, 2019

(54) VEHICULAR ILLUMINATION MECHANISM

(71) Applicant: YAZAKI CORPORATION, Tokyo (JP)

(72) Inventors: Terumitsu Sugimoto, Shizuoka (JP); Kazuya Sato, Shizuoka (JP); Kazuma Noboritate, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 33 days.

(21) Appl. No.: 15/714,529

(22) Filed: Sep. 25, 2017

(65) Prior Publication Data

US 2018/0086261 A1   Mar. 29, 2018

(30) Foreign Application Priority Data

Sep. 27, 2016   (JP) ................................. 2016-188505

(51) Int. Cl.
*B60Q 3/82*     (2017.01)
*B60Q 3/51*     (2017.01)
*B60Q 3/70*     (2017.01)
*B60Q 3/217*    (2017.01)
*A61G 3/06*     (2006.01)
*B60Q 1/48*     (2006.01)
*B60Q 1/32*     (2006.01)

(52) U.S. Cl.
CPC ............... *B60Q 3/82* (2017.02); *A61G 3/061* (2013.01); *A61G 3/062* (2013.01); *B60Q 1/323* (2013.01); *B60Q 1/486* (2013.01); *B60Q 3/217* (2017.02); *B60Q 3/51* (2017.02); *B60Q 3/70* (2017.02)

(58) Field of Classification Search
CPC ..... B60P 1/43–4435; B60Q 3/82; B60Q 3/51; B60Q 3/70; B60Q 3/217; B60Q 1/30–326; A61B 3/061–068
See application file for complete search history.

(56) References Cited

U.S. PATENT DOCUMENTS

| 2006/0045671 A1* | 3/2006 | Sobota ..................... A61G 3/06 414/263 |
| 2016/0095767 A1* | 4/2016 | Smith ..................... A61G 3/061 414/537 |
| 2016/0207448 A1* | 7/2016 | Galicia Badillo ..... B60Q 1/323 |

FOREIGN PATENT DOCUMENTS

| JP | 10-67271 A      | 3/1998 |
| JP | 2009-196537 A   | 9/2009 |

* cited by examiner

*Primary Examiner* — Gerald J Sufleta, II
(74) *Attorney, Agent, or Firm* — Kenealy Vaidya LLP (57) ABSTRACT

A vehicular illumination mechanism is mountable on a vehicle having a loading and unloading mechanism for moving a wheelchair between the vehicle and a road surface. The loading and unloading mechanism has an upper face portion and is movable between a stored position and an extended position. The vehicular illumination mechanism includes a position detection portion that is configured to detect a position of the loading and unloading mechanism, an illuminating lamp that is configured to illuminate the upper face portion of the loading and unloading mechanism extended to the extended position, and an illumination control portion that is configured to light the illuminating lamp when the position detection portion detects that the loading and unloading mechanism is in the extended position.

4 Claims, 6 Drawing Sheets

VEHICULAR ILLUMINATION MECHANISM

CROSS REFERENCE TO RELATED APPLICATIONS

This application is based on Japanese Patent Application (No. 2016-188505) filed on Sep. 27, 2016, the contents of which are incorporated herein by reference.

BACKGROUND OF THE INVENTION

1. Field of the Invention

The present invention relates to a vehicular illumination mechanism usable for welfare vehicles having a loading and unloading mechanism that enables a wheelchair to be loaded and unloaded.

2. Description of the Related Art

Conventionally, vehicles such as private cars, taxis and buses for welfare purposes are mounted with a special loading and unloading mechanism such as a slope type loading and unloading mechanism that is storable or a lift type loading and unloading mechanism (for example, see JP-A-10-67271 and JP-A-2009-196537) in order that a person such as a physically handicapped person or an elderly person can be loaded into and unloaded from the vehicle while sitting on a wheelchair.

Moreover, in a wheelchair lifter described in JP-A-10-67271, in order to improve the night-time visibility when a platform where a wheelchair can be placed is set on the ground, an illuminating lamp that illuminates the platform is provided on a support frame that supports the platform. This illuminating lamp is connected to a lighting switching circuit, and is structured so as to be lit only when a light switch is turned to the lighting side and a back door switch is closed in response to the opening of a back door.

Moreover, in a vehicular lifting and lowering device described in JP-A-2009-196537, a flat mount where a passenger sitting on a wheelchair is placed is provided, and an illuminating device that illuminates the top of the mount is provided. Moreover, a control device is structured so as to light the illuminating device when an illumination switch is turned on and turn off the illuminating device when the illumination switch is turned off.

However, in the conventional vehicular illumination mechanisms as described above, the illumination for the loading and unloading of a wheelchair cannot be lit unless the worker appropriately operates a switch such as the light switch or the illumination switch mentioned above. For this reason, in order to perform appropriate loading and unloading in an illuminated safe environment under circumstances where surroundings are dark such as at night, it is necessary for the worker or others to reliably perform the switch operation and the burden is heavy particularly when the loading and unloading are assisted by only one worker. For example, when the loading or unloading of a person to be assisted is started, in a case where the illumination switch is situated away from the doorway, a cumbersome work is required such that after ensuring the safety of the person to be assisted, the worker moves to a place away from the person to be assisted to operate the illumination switch and returns again to the position of the person to be assisted to start the loading or unloading.

Moreover, when a person to be assisted is loaded into or unloaded from a vehicle, since it is necessary to simultaneously secure space for stopping the vehicle and sufficient space for setting a wheelchair, when the loading or unloading is performed, for example, on a road or in a public parking lot, large space on the road or the like is temporarily occupied for the work. In particular, when the person to be assisted is loaded or unloaded from a side door of the vehicle, large space is required in the direction of width of the road.

When a person to be assisted on a wheelchair is loaded or unloaded from a side door of a vehicle, there are cases where the drivers of other vehicles such as cars, motorcycles and bicycles approaching from behind the vehicle are difficult to notice that a wheelchair is being loaded or unloaded at any time of the day or night, and this can cause a dangerous situation.

SUMMARY OF THE INVENTION

The present invention is made in view of the above-described circumstances, and an object thereof is to provide a vehicular illumination mechanism capable of, when a person to be assisted on a wheelchair is loaded into and unloaded from a vehicle, ensuring the safety of the loading and unloading and reducing the burden of the work to be performed by the worker.

To attain the above-mentioned object, a vehicular illumination mechanism according to the present invention is characterized by the following (1) to (6):

(1) A vehicular illumination mechanism that is mountable on a vehicle having a loading and unloading mechanism for moving a wheelchair between the vehicle and a road surface, wherein:

the loading and unloading mechanism has an upper face portion where the wheelchair can pass or be placed, and is movable between a stored position where the loading and unloading mechanism is stored in a vicinity of a doorway of the vehicle and an extended position where a level difference between the upper face portion and the road surface is minimum, and the vehicular illumination mechanism includes:

a position detection portion that is configured to detect a position of the loading and unloading mechanism;

an illuminating lamp that is configured to illuminate the upper face portion of the loading and unloading mechanism extended to the extended position; and an illumination control portion that is configured to light the illuminating lamp when the position detection portion detects that the loading and unloading mechanism is in the extended position.

(2) The vehicular illumination mechanism according to the above (1), further including:

a vehicle interior illuminating lamp configured to illuminate a vehicle interior in the vicinity of the doorway, wherein:

the illumination control portion is configured to light the vehicle interior illuminating lamp when the loading and unloading mechanism is extended to the extended position.

(3) The vehicular illumination mechanism according to the above (1) or (2), further including:

a door lamp mounted on a peripheral portion, on a vehicle rear side, of a door provided so as to be openable and closable at the doorway, wherein:

the illumination control portion is configured to light or blink the door lamp when the loading and unloading mechanism is extended to the extended position.

(4) The vehicular illumination mechanism according to the above (3), wherein the door lamp mounted with a light emitting surface thereof facing rearward of the vehicle on a sliding door that is configured to open and close the doorway by moving in a front-rear direction of the vehicle.

(5) The vehicular illumination mechanism according to the above (4), wherein:

the illumination control portion is configured to turn off the door lamp when it is detected that the sliding door is closed.

(6) The vehicular illumination mechanism according to the above (1), wherein:

the illuminating lamp is configured to illuminate the upper face portion of the loading and unloading mechanism so as to display a movement line corresponding to an appropriate movement path where the wheelchair is to move at a time of loading and unloading by a linear illumination.

According to the vehicular illumination mechanism of the structure of the above (1) and (6), when a wheelchair is loaded or unloaded, the illuminating lamp is automatically lit under the control of the illumination control portion according to the position of the loading and unloading mechanism without the helper or other workers performing a special switch operation. Consequently, even in dark environments such as at night, the helper or others operating the wheelchair can surely grasp, for example, the positional relationship between the wheelchair and the loading and unloading mechanism by the illumination light, which enables safe loading and unloading. Further, since no switching operation for illumination is required, the burden of the work is reduced.

According to the vehicular illumination mechanism of the structure of the above (2), since the vehicle interior illuminating lamp as well as the illuminating light is automatically lit at the time of loading and unloading, a wider area can be illuminated brightly. Consequently, safer loading and unloading are enabled. Further, it is unnecessary to perform a special switch operation for lighting the vehicle interior illuminating lamp, so that the burden of the work is reduced.

According to the vehicular illumination mechanism of the structure of the above (3), when a wheelchair is loaded or unloaded, the door lamp provided on the rear side of the door that is opened for loading or unloading is automatically lit or blinked. Consequently, drivers of other cars, motorcycles, bicycles and the like existing behind the vehicle where wheelchair loading or unloading is performed can be alerted before they come near, so that the risk of collision and the like can be avoided.

According to the vehicular illumination mechanism of the structure of the above (4), since the door lamp is set on the peripheral portion of the sliding door on the rear side, excellent visibility for the drivers of other cars, motorcycles, bicycles and the like existing behind the vehicle where wheelchair loading or unloading is performed can be secured. That is, the light of the lamp can be emitted always in the same direction (rearward) irrespective of change of the opened position since the door moves linearly, so that the light of the lamp surely reaches the field of view of the drivers to be alerted situated behind without the light of the lamp being intercepted by the wheelchair or the passenger.

According to the vehicular illumination mechanism of the structure of the above (5), when the loading or unloading of the wheelchair is finished and the sliding door is closed, the door lamp is automatically turned off without the worker performing a special switch operation. Consequently, wasteful power consumption by the door lamp can be avoided, so that the burden of the work never increases.

According to the vehicular illumination mechanism of the present invention, when a person to be assisted on a wheelchair is loaded into or unloaded from a vehicle, the illuminating lamp is automatically lit under the control of the illumination control portion according to the position of the loading and unloading mechanism without the helper or other workers performing a special switch operation. Consequently, even in dark environments such as at night, the helper or others operating the wheelchair can surely grasp, for example, the positional relationship between the wheelchair and the loading and unloading mechanism by the illumination light, which enables safe loading and unloading. Further, since no switching operation for illumination is required, the burden of the work is reduced.

The present invention has been briefly described above. Further, details of the present invention will be further clarified by reading through the mode for carrying out the invention (hereinafter, referred to as "embodiment") described below with reference to the attached drawings.

DETAILED DESCRIPTION OF THE EXEMPLARY EMBODIMENTS

A concrete embodiment related to the present invention will be described below with reference to the drawings.

First, a concrete example of the environment in which the vehicular illumination mechanism is used will be described.

Figure 1:
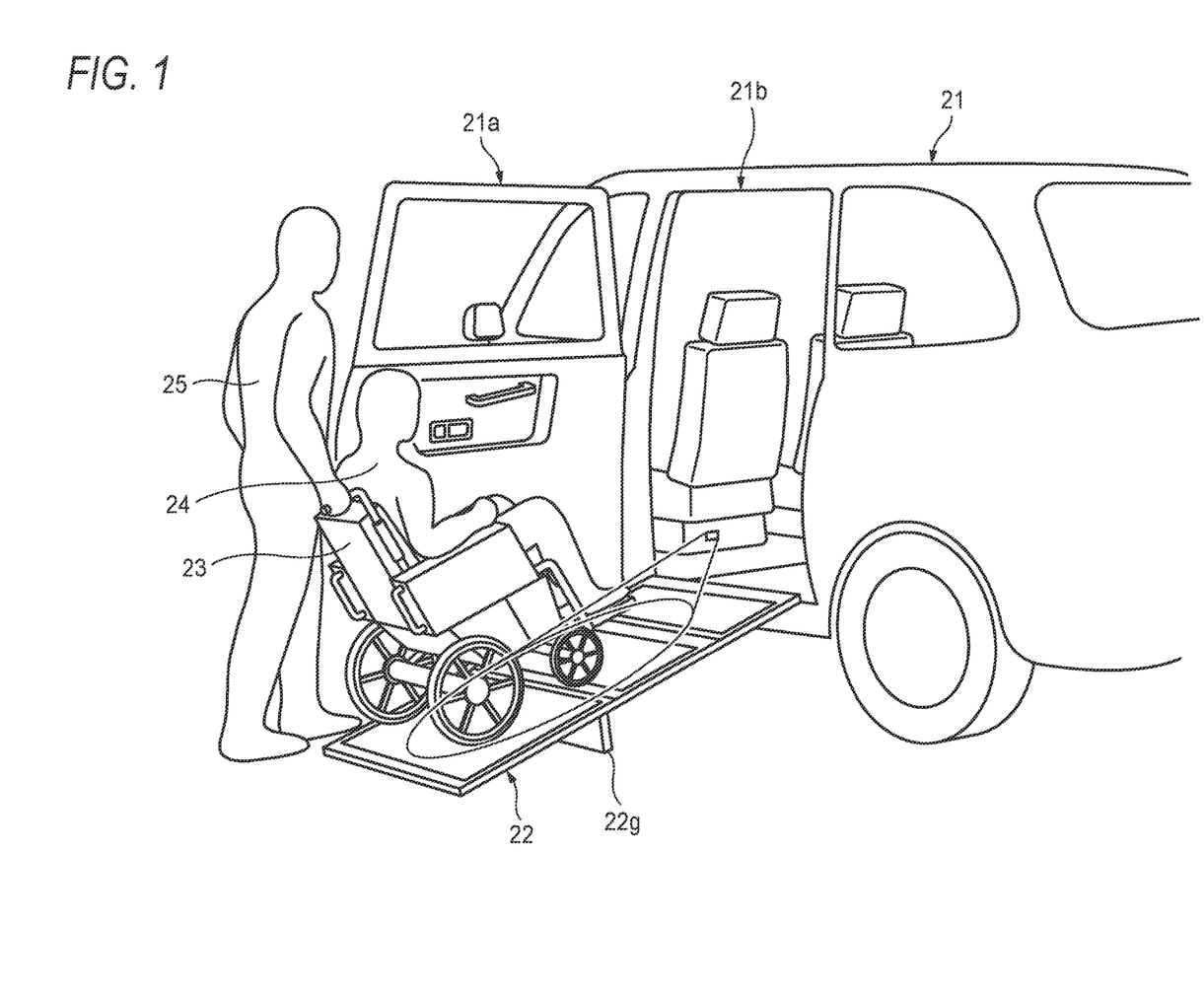
FIG. 1 is a perspective view showing a concrete example of a manner in which a passenger sitting on a wheelchair is loaded into a vehicle by using a loading and unloading mechanism.

A concrete example of a manner in which a passenger 24 sitting on a wheelchair 23 is loaded into a vehicle 21 by using a slope type loading and unloading mechanism 22 is shown in FIG. 1.

When the passenger 24 using the wheelchair 23 like a physically handicapped person or an elderly person is loaded into or unloaded from the vehicle 21, the passenger 24 is loaded or unloaded, for example, as shown in FIG. 1. That is, a side door 21a of the vehicle 21 is opened, and by using the slope type loading and unloading mechanism 22 extended from a doorway 21b to a position close to the road surface, the wheelchair 23 is moved along the upper face of the slope type loading and unloading mechanism 22 with the assistance of a helper 25. The slope type loading and unloading mechanism 22 can be stored in the vehicle 21 in a downsized state by being folded or by an extending and shrinking mechanism. There are cases where lift type loading and unloading mechanisms as shown in JP-A-10-67271 and JP-A-2009-196537 are used instead of the slope type loading and unloading mechanism 22.

When the passenger 24 is loaded or unloaded on the wheelchair 23 by using the slope type loading and unloading mechanism 22 or the like as shown in FIG. 1, it is necessary that the wheelchair 23 can be loaded or unloaded safely and easily without dropping off from the upper face of the slope type loading and unloading mechanism 22 or interfering with part of the body of the vehicle 21 even in dark environments such as at night and at dusk. Moreover, in order to prevent problems such as collision during the loading and unloading not only in dark environments, it is necessary to provide the drivers of other vehicles approaching from behind the vehicle 21 with an alert that loading or unloading is being performed. In particular, when the loading or unloading of the wheelchair 23 is performed from the side door 21a of the vehicle 21, a special alert is very important since the passenger 24 and others are sometimes difficult to see from the drivers of vehicles approaching from behind.

Therefore, illumination is performed by using the vehicular illumination mechanism of the present invention so that the wheelchair 23 can be safely and easily loaded and unloaded without dropping off from the upper face of the slope type loading and unloading mechanism 22 or interfering with part of the body of the vehicle 21 even in dark environments such as at night and at dusk. Moreover, an alert is provided by using the vehicular illumination mechanism of the present invention in order to prevent the occurrence of, for example, collision of other vehicles approaching from behind during the loading and unloading not only in dark environments. However, in a case where a special button operation or the like is required for illumination, the burden on the worker such as the helper 25 increases, so that there is a possibility that the illumination does not work because of a wrong operation or that a useless illumination operation is continued. Accordingly, the vehicular illumination mechanism of the present invention is mounted with a special automatic illumination control function as described later.

Next, a concrete example of the vehicle mounted with the vehicular illumination mechanism will be described.

Figure 2:
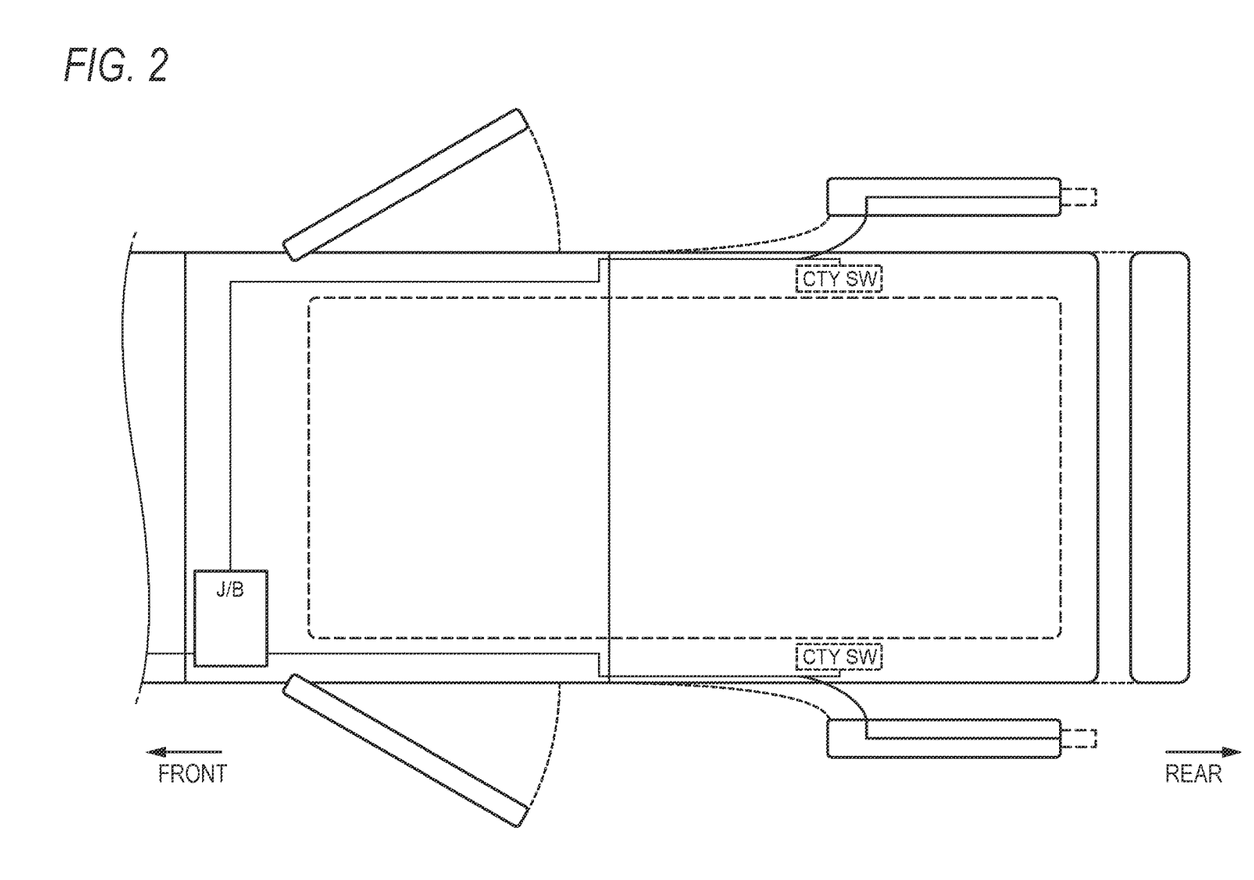
FIG. 2 is a plan view showing a condition where the vehicle interior portion of a vehicle mounted with a vehicular illumination mechanism in an embodiment of the present invention is viewed from above.

A concrete example of the condition where the vehicle interior portion of a vehicle 21B mounted with the vehicular illumination mechanism in the embodiment of the present invention is viewed from above is shown in FIG. 2. Moreover, the condition where the doorway 21b shown in FIG. 2 is viewed from behind is shown in FIG. 3.

Figure 3:
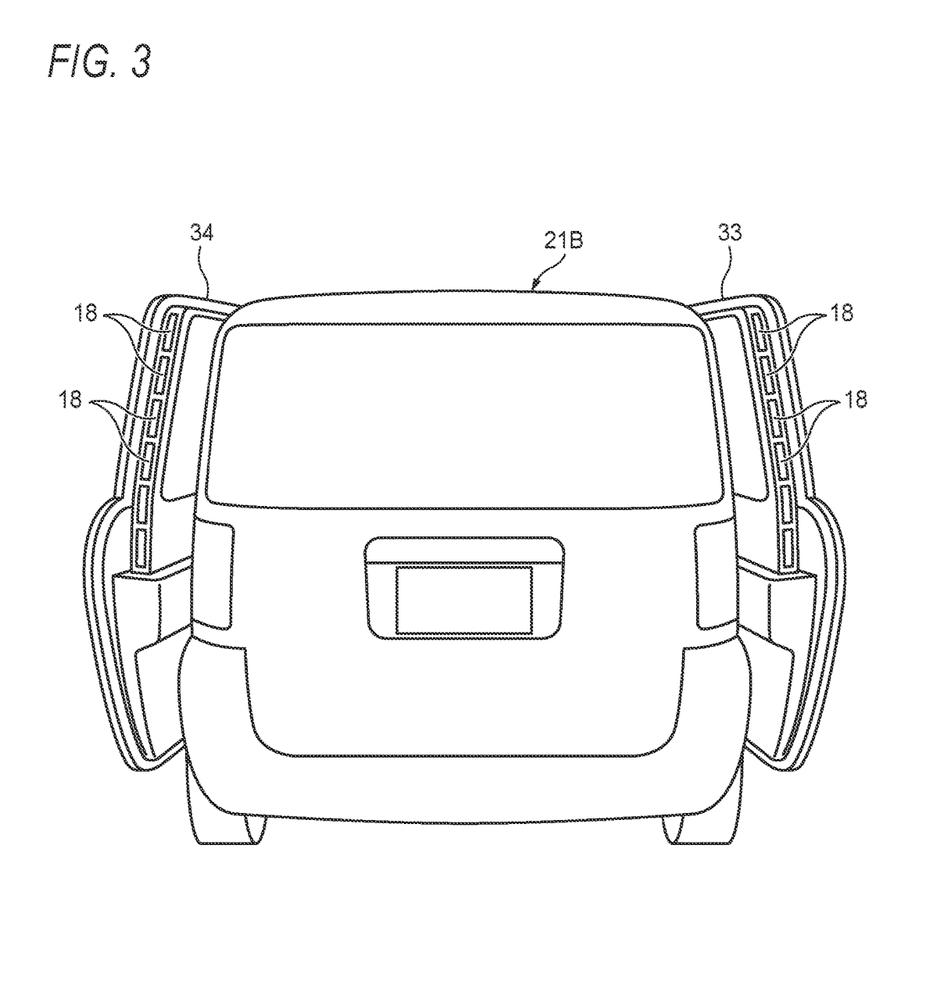
FIG. 3 is a rear view showing the condition where the vehicle shown in FIG. 2 is viewed from behind.

While the doorway 21b shown in FIGS. 2 and 3 is different from the vehicle 21 shown in FIG. 1 in that sliding doors 33 and 34 are adopted as the rear doors, the passenger 24 can be loaded and unloaded on the wheelchair 23 by using the slope type loading and unloading mechanism 22 or the like from a side of the vehicle like the example shown in FIG. 1.

The vehicle 21B shown in FIGS. 2 and 3 is provided with doors 31 and 32 disposed on the right and left on the front side of the vehicle interior and the sliding doors 33 and 34 disposed on the right and left on the rear side of the vehicle interior. The front doors 31 and 32 are openable and closable doors of a general structure, have the front sides thereof coupled to the vehicle body through a predetermined hinge mechanism and are opened and closed by pivoting with respect to the support portion of the hinge mechanism.

The rear sliding doors 33 and 34 are supported by the vehicle body in a state of being movable substantially linearly in the front-rear direction of the vehicle body, and can be automatically or manually positioned at a position where the doorway is opened and at a position where the doorway is closed as shown in FIGS. 2 and 3.

Two sliding door opening and closing sensors 14 provided on the right and left of the vehicle body side of the vehicle 21B are capable of detecting the open/close state of the sliding doors 33 and 34 by on/off of a mechanical switch. Moreover, a sliding door rear edge lamp 18 is set on the peripheral portion of each of the sliding doors 33 and 34 on the rear side of the vehicle.

The sliding door rear edge lamps 18 are structured by vertically arranging a plurality of light emitting elements such as LED elements in a line as shown in FIG. 3. These light emitting elements are arranged in a direction where they can emit light toward the rear of the vehicle like the stop lamp of the vehicle. Consequently, when the sliding door rear edge lamps 18 are lit or blinking, the drivers of other vehicles approaching from behind the vehicle 21B can visually recognize the light from the sliding door rear edge lamps 18 at the right and left end portions of the vehicle 21B with reliability, so that even when the passenger 24 and others cannot be visually recognized, the drivers can easily recognize that they should be careful about driving in front.

As shown in FIG. 2, the vehicle 21B has four doorways 35FR, 35FL, 35RR and 35RL where passengers can be loaded and unloaded when the doors 31 and 32 and the sliding doors 33 and 34 are opened, respectively. A mechanism such as the slope type loading and unloading mechanism 22 shown in FIG. 1 is disposed in the vicinity of any of the doorways 35RR and 35RL on the rear side of the vehicle, and is used by being switched from a predetermined stored state to an extended state as shown in FIG. 1 by a movement or a deformation when the passenger 24 is loaded and unloaded on the wheelchair 23. By switching to the extended state, the end portion of the slope type loading and unloading mechanism 22 moves to a position close to the road surface, so that there is hardly any level difference between the road surface and the upper face of the slope type loading and unloading mechanism 22.

Next, principal elements of the vehicular illumination mechanism will be described.

Figure 4:
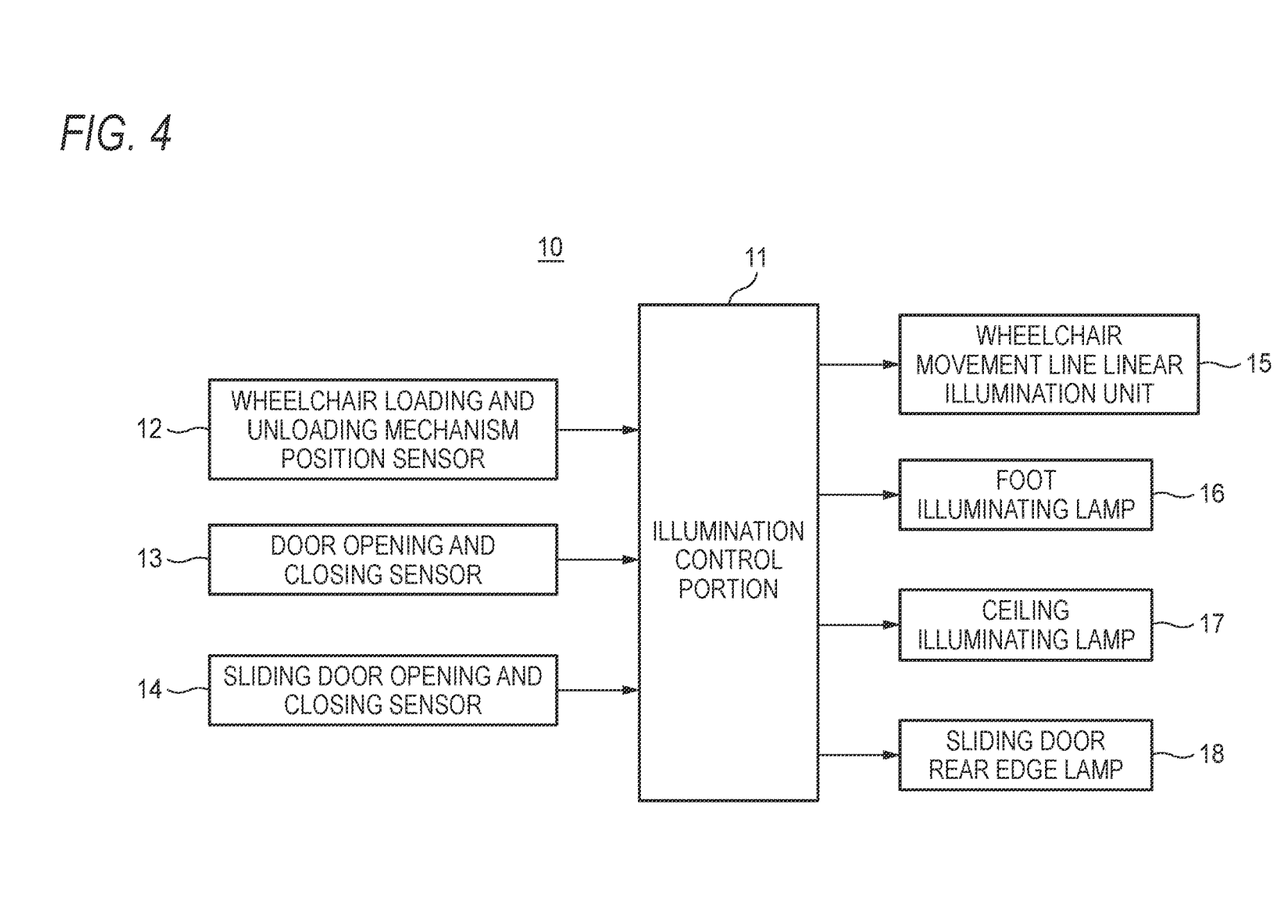
FIG. 4 is a block diagram showing principal elements of the vehicular illumination mechanism in the embodiment of the present invention.

Principal elements of the vehicular illumination mechanism 10 in the embodiment of the present invention are shown in FIG. 4.

As shown in FIG. 4, the vehicular illumination mechanism 10 is provided with an illumination control portion 11, a wheelchair loading and unloading mechanism position sensor 12, a door opening and closing sensor 13, the sliding door opening and closing sensors 14, a wheelchair movement line linear illumination unit 15, foot illuminating lamps 16, a ceiling illuminating lamp 17 and the sliding door rear edge lamps 18.

Although not shown, electric circuits such as a microcomputer as a nucleus of control, a signal processing circuit that processes input signals and a driver for controlling the energization of each of various loads are provided inside the illumination control portion 11. The microcomputer in the illumination control portion 11 executes various kinds of processing based on programs and data previously written to a memory such as a ROM, and implements various functions necessary for the vehicular illumination mechanism 10. The functions implemented by the microcomputer will be described later.

The wheelchair loading and unloading mechanism position sensor 12 is capable of detecting whether the slope type loading and unloading mechanism 22 shown in FIG. 1, for example, is at the position of the extended state as shown in FIG. 1 and the position of the stored state where it is retracted into the vehicle to be downsized and stored, for example, by using a mechanical switch or a semiconductor sensor.

The door opening and closing sensor 13 is formed of, for example, two mechanical switches placed in different positions on the vehicle body side, and is capable of outputting an electric signal representative of whether each of the doors 31 and 32 is opened or closed.

The sliding door opening and closing sensors 14 are disposed, as shown in FIG. 2, in the vicinity of the doorways 35RR and 35RL, respectively, and are capable of outputting an electric signal representative of whether each of the sliding doors 33 and 34 is opened or closed.

The wheelchair movement line linear illumination unit 15 is used for brightly displaying the movement line corresponding to the appropriate movement path where the wheelchair 23 is to move at the time of loading and unloading, by a linear illumination so that the helper 25 and others can visually recognize it on the upper face of the slope type loading and unloading mechanism 22 in the extended state. Specifically, the following are used: a pair of right and left linear illuminating lamps representative of the paths where the right and left wheels of the wheelchair 23 are to pass, respectively (see FIG. 6A) or a pair of linear illuminating lamps representative of the paths where the central part of the wheelchair 23 is to pass (see FIG. 6B). To enable such linear illumination, the wheelchair movement line linear illumination unit 15 is provided with a plurality of aggregations of, for example, a multiplicity of LED elements or the like arranged in a line.

As the wheelchair movement line linear illumination unit 15, a structure may be adopted in which as shown in FIG. 1, a light source 41 is set in the vehicle inferior so that the illumination from the light source illuminates the entire area of the upper face of the slope type loading and unloading mechanism 22 in the extended state. Alternatively, a structure may be adopted in which the light source 41 that illuminates part of the upper face of the slope type loading and unloading mechanism 22 and the wheelchair movement line linear illumination unit 15 are combined.

The foot illuminating lamps 16 are, for example, two lamps (courtesy lamps) set in a state of being exposed to the surface of the inside (the inside of the vehicle interior) of the front side doors 31 and 32 shown in FIG. 2, and have the function of brightly illuminating the place of the passenger's feet when the passenger is loaded or unloaded. Moreover, this illumination may be used for alerting other vehicles approaching from behind. However, when the wheelchair 23 is loaded or unloaded at a side of the vehicle by using the slope type loading and unloading mechanism 22, there are cases where the illumination light of the foot illuminating lamp 16 is intercepted by the wheelchair 23, the passenger 24, the helper 25 or the like and cannot be visually recognized by the drivers of the other vehicles approaching from behind.

The ceiling illuminating lamp 17 is a lamp that is set on the ceiling part in the vehicle interior, and is capable of emitting illumination light from the ceiling toward the floor surface side. The ceiling illuminating lamp 17 illuminates the vehicle interior and the vicinity of the doorway when the passenger is loaded or unloaded to enable the loading or unloading to be facilitated in environments where surroundings are dark like at night.

The sliding door rear edge lamps 18 are formed of a multiplicity of aggregations of light emitting elements such as LED elements, and as shown in FIGS. 2 and 3, are set on the peripheral portion of the sliding doors 33 and 34 on the vehicle rear side.

Next, a characteristic operation example of the vehicular illumination mechanism will be described.

Figure 5:
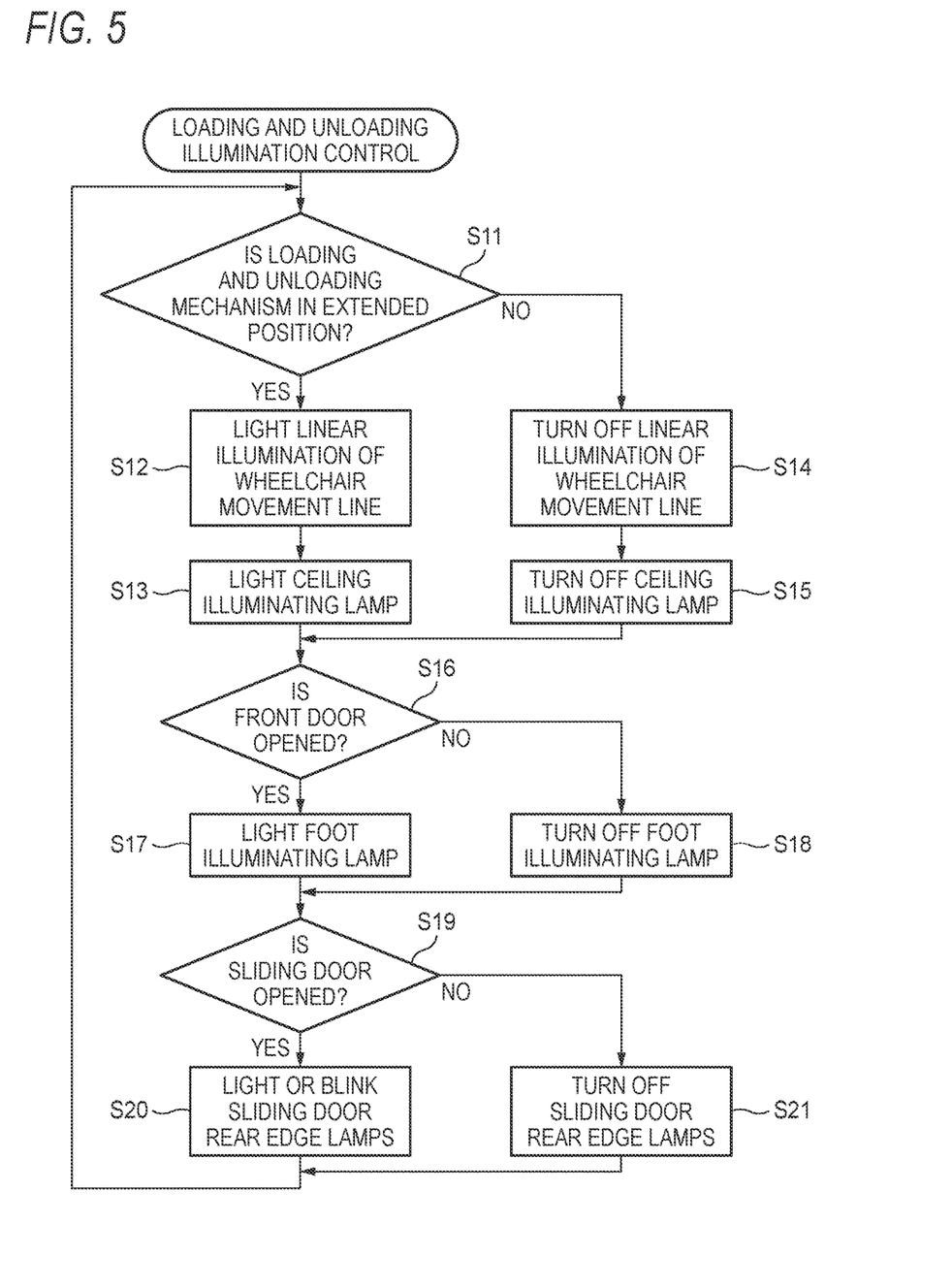
FIG. 5 is a flowchart showing a characteristic operation example of the vehicular illumination mechanism in the embodiment of the present invention.

The characteristic operation example of the vehicular illumination mechanism of the embodiment of the present invention is shown in FIG. 5. That is, when the passenger is loaded or unloaded, the microcomputer in the illumination control portion 11 shown in FIG. 4 executes the processing shown in FIG. 5 to automatically control various kinds of illumination.

<Control of the Linear Illumination of the Wheelchair Movement Line and the Ceiling Illuminating Lamp>

When executing the processing shown in FIG. 5, based on an electric signal outputted by the wheelchair loading and unloading mechanism position sensor 12, the microcomputer determines whether the slope type loading and unloading mechanism 22 is in the extended position or not at step S11, and proceeds to step S12 or S14 according to the result.

That is, when the slope type loading and unloading mechanism 22 is in the extended position as shown in FIG. 1, the microcomputer controls the light emitting elements in the wheelchair movement line linear illumination unit 15 to energized state at step S12. Thereby, the linear illumination is lit along the appropriate movement line of the wheelchair on the upper face of the slope type loading and unloading mechanism 22. Therefore, even in environments where surroundings are dark like at night, the wheelchair 23 can be easily prevented from dropping off from the upper face of the slope type loading and unloading mechanism 22 or interfering part of the vehicle body.

Moreover, at the next step S13, the microcomputer switches the ceiling illuminating lamp 17 to energized state. Thereby, the ceiling illuminating lamp 17 is lit to illuminate the area such as the floor surface in the vehicle interior and the doorway 35RL where the slope type loading and unloading mechanism 22 is drawn out, so that the loading and unloading of the wheelchair 23 are facilitated even in environments where surroundings are dark like at night.

On the other hand, when the slope type loading and unloading mechanism 22 is in the stored position, the microcomputer controls the light emitting elements in the wheelchair movement line linear illumination unit 15 to non-energized state at step S14. Thereby, the linear illumination of the movement line is automatically turned off. Moreover, since the microcomputer controls the ceiling illuminating lamp 17 to non-energized state at step S15, the vehicle interior illumination from the ceiling is also automatically turned off.

<Control of the Foot Illuminating Lamps>

When executing the processing shown in FIG. 5, based on the electric signal outputted by the door opening and closing sensor 13, the microcomputer determines whether the front door 31 or 32 is opened or not at step S16, and proceeds to step S17 or S18 according to the result.

That is, when the front door 31 or 32 is opened, the microcomputer switches the foot illuminating lamps 16 to energized state at step S17 to light the foot illumination. For example, when the slope type loading and unloading mechanism 22 is drawn out to the road surface side from the doorway 35RL shown in FIG. 2 to load or unload the wheelchair 23, it is assumed that the front door 32 is maintained opened at the same time. In that case, since the microcomputer executes step S17, the foot illuminating lamps 16 attached to the vehicle interior side surface of the front door 32 that is opened illuminates the area such as the slope type loading and unloading mechanism 22 and the feet of the passenger 24 existing on the rear side thereof.

Moreover, when the front doors 31 and 32 are closed, the microcomputer switches the foot illuminating lamps 16 to non-energized state at step S18 to turn off the foot illumination. Consequently, the foot illumination that is unnecessary when no loading or unloading is performed can be automatically turned off.

<Control of the Sliding Door Rear Edge Lamps>

When executing the processing shown in FIG. 5, based on the electric signal outputted by the sliding door opening and closing sensors 14, the microcomputer determines whether the rear sliding door 33 or 34 is opened or not at step S19, and proceeds to the processing of step S20 or S21 according to the result.

That is, when the rear sliding door 33 or 34 is opened, the microcomputer switches the sliding door rear edge lamps 18 to energized state at step S20, and controls the illumination of the rear edge lamps so as to be lit or blink at step S20. Consequently, the entire rear part of the vehicle 21B as shown in FIG. 3 is seen in the field of view of the drivers of other vehicles approaching from behind the vehicle 21B and further, the illumination light of the rear edge lamps that are lit or blinking on the right and left end portions of the vehicle surely reaches the drivers' field of view, so that the drivers can be alerted.

On the other hand, when the rear sliding doors 33 and 34 are closed, since the microcomputer switches the sliding door rear edge lamps 18 to non-energized state at step S21, the illumination of the rear edge lamps is automatically turned off. That is, when the loading or unloading of the passenger 24 sitting on the wheelchair 23 is completed so that the slope type loading and unloading mechanism 22 is stored and the rear sliding doors 33 and 34 are closed, the unnecessary illumination of the rear edge lamps is automatically turned off without the helper 25 or others performing a special switch operation.

Next, structure examples of the loading and unloading mechanism will be described.

Figure 6A:
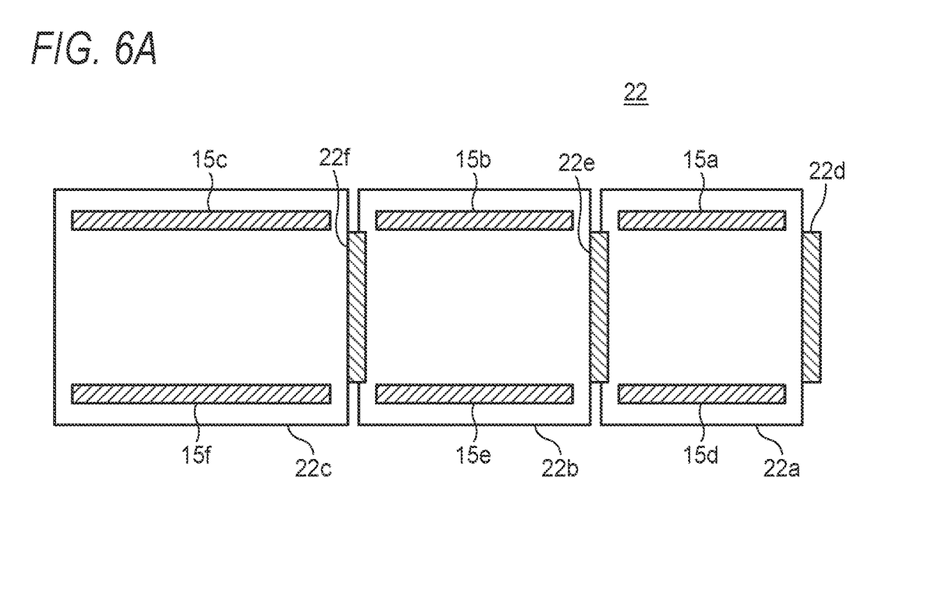
FIGS. 6A and 6B are plan views showing structure examples of the loading and unloading mechanism.
Figure 6B:
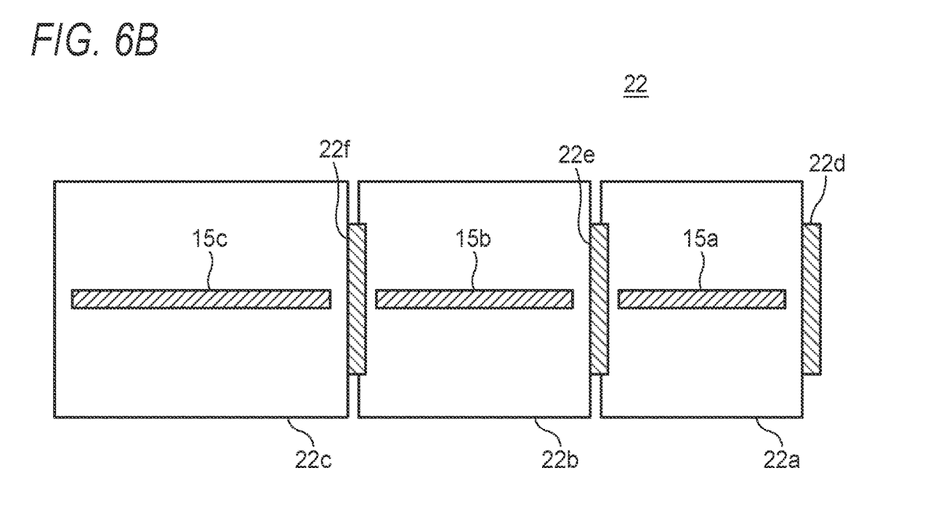

The structure examples of the slope type loading and unloading mechanism 22 in the position of the extended state are shown in FIGS. 6A and 6B, respectively.

The slope type loading and unloading mechanisms 22 shown in FIGS. 6A and 6B are formed of three rectangular plate portions 22a, 22b and 22c coupled by coupling portions 22e and 22f, and are coupled to the vehicle body by a coupling portion 22d. Moreover, the coupling portions 22d, 22e and 22f are formed of hinge members that are bendable in a specific direction. Therefore, the slope type loading and unloading mechanisms 22 can be selectively used between in the state of being developed and in the state of being folded small so as to be storable in the vehicle as shown in FIGS. 6A and 6B. Moreover, although not shown, at each of the positions of the coupling portions 22d, 22e and 22f, a predetermined stopper is provided so as to prevent rotation of more than a predetermined amount. Further, a support member 22g the lower end of which abuts on the road surface as shown in FIG. 1 is provided so that the slope of the slope type loading and unloading mechanism 22 in the developed state is not deformed at the time of loading and unloading.

In the slope type loading and unloading mechanism 22 shown in FIG. 6A, linear illumination portions 15a, 15b and 15c are linearly arranged on one side, in the width direction, of the rectangular plate portions 22a, 22b and 22c, respectively. Moreover, linear illumination portions 15d, 15e and 15f are linearly arranged on the other end side, in the width direction, of the plate portions 22a, 22b and 22c, respectively. These linear illumination portions 15a to 15f are each an aggregation of a multiplicity of light emitting elements arranged in a line, and are included in the wheelchair movement line linear illumination unit 15.

That is, in the slope type loading and unloading mechanism 22 shown in FIG. 6A, the linear illumination portions 15a to 15f are arranged in the vicinity of the appropriate paths (movement lines) where the right and left wheels of the wheelchair 23 are to pass at the time of loading and unloading. Therefore, when the linear illumination portions 15a to 15f are lit, the helper 25 who moves the wheelchair 23 on the slope of the slope type loading and unloading mechanism 22 at the time of loading and unloading can easily check whether the positions of the right and left ends of the wheelchair 23 are appropriate or not while visually recognizing the linear illumination.

In the slope type loading and unloading mechanism 22 shown in FIG. 6B, the linear illumination portions 15a, 15b and 15c are linearly arranged in positions along the central part, in the width direction, of the plate portions 22a, 22b and 22c, respectively. These linear illumination portions 15a to 15c are each an aggregation of a multiplicity of light emitting elements arranged in a line, and are included in the wheelchair movement line linear illumination unit 15.

That is, in the slope type loading and unloading mechanism 22 shown in FIG. 6B, the linear illumination portions 15a to 15c are arranged in the vicinity of the appropriate paths (movement lines) where the central part of the wheelchair 23 is to pass at the time of loading and unloading. Therefore, when the linear illumination portions 15a to 15c are lit, the helper 25 who moves the wheelchair 23 on the slope of the slope type loading and unloading mechanism 22 at the time of loading and unloading can easily confirm whether the position of the center of the wheelchair 23 is appropriate or not while visually recognizing the linear illumination Now, features of the above-described embodiment of the vehicular illumination mechanism according to the present invention is briefly summarized and listed in the following [1] to [6]:

[1] A vehicular illumination mechanism that is mountable on a vehicle (21B) having a loading and unloading mechanism for moving a wheelchair (23) between the vehicle and a road surface, wherein:

the loading and unloading mechanism (the slope type loading and unloading mechanism 22) has an upper face portion where the wheelchair can pass or be placed, and is movable between a stored position where the loading and unloading mechanism is stored in a vicinity of a doorway of the vehicle and an extended position where a level difference between the upper face portion and the road surface is minimum, and the vehicular illumination mechanism (10) includes:

a position detection portion (the wheelchair loading and unloading mechanism position sensor 12) that is configured to detect a position of the loading and unloading mechanism;

an illuminating lamp (the wheelchair movement line linear illumination unit 15) that is configured to illuminate the upper face portion of the loading and unloading mechanism extended to the extended position; and an illumination control portion (11, step S12) that is configured to light the illuminating lamp when the position detection portion detects that the loading and unloading mechanism is in the extended position.

[2] The vehicular illumination mechanism according to the above [1], further including:
a vehicle interior illuminating lamp (the ceiling illuminating lamp 17) configured to illuminate a vehicle interior in the vicinity of the doorway, wherein:
the illumination control portion (11) is configured to light the vehicle interior illuminating lamp when the loading and unloading mechanism is extended to the extended position (step S13).

[3] The vehicular illumination mechanism according to the above [1] or [2], further including:
a door lamp (the sliding door rear edge lamps 18) mounted on a peripheral portion, on a vehicle rear side, of a door provided so as to be openable and closable at the doorway, wherein:
the illumination control portion (11) is configured to light or blink the door lamp when the loading and unloading mechanism is extended to the extended position (step S20).

[4] The vehicular illumination mechanism according to the above [3],
wherein the door lamp is mounted with a light emitting surface thereof facing rearward of the vehicle on a sliding door (33, 34) that is configured to open and close the doorway by moving in a front-rear direction of the vehicle.

[5] The vehicular illumination mechanism according to the above [4], wherein:
the illumination control portion (11) is configured to turn off the door lamp when it is detected that the sliding door is closed (step S21).

[6] The vehicular illumination mechanism according to the above [1], wherein:
the illuminating lamp (the wheelchair movement line linear illumination unit 15) is configured to illuminate the upper face portion of the loading and unloading mechanism (the slope type loading and unloading mechanism 22) so as to display a movement line corresponding to an appropriate movement path where the wheelchair (23) is to move at a time of loading and unloading by a linear illumination.

What is claimed is:

1. A vehicular illumination mechanism that is mountable on a vehicle having a loading and unloading mechanism for moving a wheelchair between the vehicle and a road surface, wherein:
the loading and unloading mechanism has an upper face portion where the wheelchair can pass or be placed, and is movable between a stored position where the loading and unloading mechanism is stored in a vicinity of a doorway of a vehicle body of the vehicle and an extended position where a level difference between the upper face portion and the road surface is minimum, and
the vehicular illumination mechanism comprises:
a position detection portion that is configured to detect a position of the loading and unloading mechanism;
an illuminating lamp that is configured to illuminate the upper face portion of the loading and unloading mechanism extended to the extended position;
an illumination control portion that is configured to light the illuminating lamp when the position detection portion detects that the loading and unloading mechanism is in the extended position; and
a door lamp mounted on a peripheral portion of a sliding door at a vehicle rear side thereof, the sliding door provided so as to be openable and closable at the doorway,
wherein the illumination control portion is configured to light or blink the door lamp when the loading and unloading mechanism is extended to the extended position, and
the door lamp is mounted with a light emitting surface on the sliding door facing rearward of the vehicle, the sliding door being configured to open and close the doorway by moving in a front-rear direction of the vehicle along an outer face of the vehicle body of the vehicle, and
wherein the illuminating lamp is configured to illuminate the upper face portion of the loading and unloading mechanism so as to display a movement line corresponding to an appropriate movement path where the wheelchair is to move at a time of loading and unloading by a linear illumination.

2. The vehicular illumination mechanism according to claim 1, further comprising:
a vehicle interior illuminating lamp configured to illuminate a vehicle interior in the vicinity of the doorway, wherein:
the illumination control portion is configured to light the vehicle interior illuminating lamp when the loading and unloading mechanism is extended to the extended position.

3. The vehicular illumination mechanism according to claim 1, wherein:
the illumination control portion is configured to turn off the door lamp when it is detected that the sliding door is closed.

4. The vehicular illumination mechanism according to claim 1, wherein the illuminating lamp includes a plurality of lamps spaced apart to each other on the upper face portion of the loading and unloading mechanism of the vehicle.

* * * * *